W. G. WILLCOX.
Smut Machine.

No. 59,493.

Patented Nov. 6, 1866.

WITNESSES:

INVENTOR.

UNITED STATES PATENT OFFICE.

WILLIAM G. WILLCOX, OF WATERLOO, WISCONSIN.

IMPROVEMENT IN SMUT-MACHINES.

Specification forming part of Letters Patent No. 59,493, dated November 6, 1866.

*To all whom it may concern:*

Be it known that I, W. G. WILLCOX, of Waterloo, in the county of Jefferson and State of Wisconsin, have invented a new and Improved Fan and Beater for Smut-Mills; and I do hereby declare that the following is a full, clear, and exact description thereof, which will enable others skilled in the art to make and use the same, reference being had to the accompanying drawings, forming part of this specification, in which—

Figure 1:
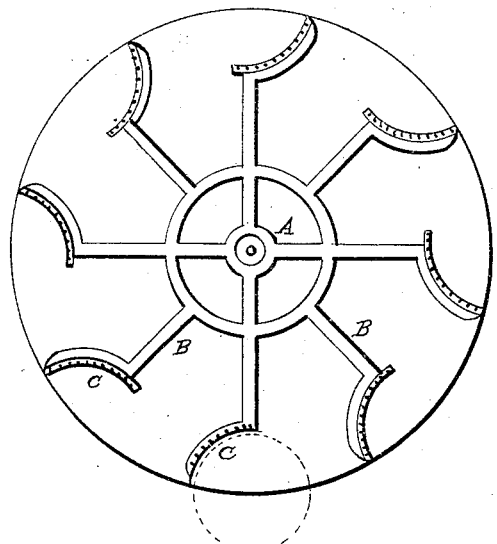
Figure 2:
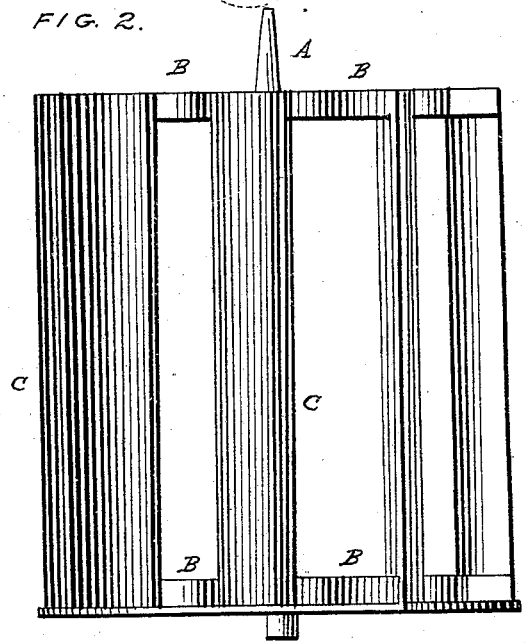

Figure 1 is an end view of my invention; Fig. 2, a face view of the same.

Similar letters of reference indicate like parts.

This invention relates to a new and improved fan and beater for smut-mills, whereby the grain will be more thoroughly scoured than heretofore and all impurities taken from it.

The invention consists in having the wings or beaters constructed of concave form in their transverse section and fluted or corrugated longitudinally on their concave face sides, as hereinafter fully shown and described, whereby the desired end is obtained.

A represents the shaft of the beater, having radial arms B projecting from it at each end.

C represents the wings or beaters, which are of concave form in their transverse section, as shown in Fig. 1, the concave sides being the face sides of the wings or beaters. These wings or beaters may be described as forming a longitudinal quarter of a hollow cylinder, and they are connected to the arms B at one edge, and have such a position that the arms B will be radial with the circles of which the wings or beaters form a part, as well as radial with the shaft A, as will be fully understood by referring to Fig. 1, in which a circle of which one of the wings or beaters forms a part is shown in red outline.

The concave face sides of the wings or beaters are fluted or grooved longitudinally to form a rough or corrugated surface. These surfaces act as rasps and effectually scour the grain, depriving it of all adhering smut, &c., and without breaking or injuring the grain in the least. A very efficient blast is also generated by the rotation of the fan and beater.

Having thus described my invention, I claim as new and desire to secure by Letters Patent—

The vertical corrugated beater-wings, constructed in the form and manner described, and attached to the radial arms in such manner that the wings will have the relative position in regard to the case, substantially as shown and set forth.

W. G. WILLCOX.

Witnesses:
DAVID WILLIAMS,
ORLANDO WALDORF.